(12) United States Patent (10) Patent No.: US 7,443,047 B2
Ottersen (45) Date of Patent: Oct. 28, 2008

(54) MULTIPHASED AND MULTIDIMENTIONAL WAVE CONVERTER

(76) Inventor: Hans-Olav Ottersen, P.O. Box 44, Sandium, Faervik (NO) N-4852

( * ) Notice: Subject to any disclaimer, the term of this patent is extended or adjusted under 35 U.S.C. 154(b) by 73 days.

(21) Appl. No.: 11/630,710
(22) PCT Filed: Jun. 23, 2005
(86) PCT No.: PCT/NO2005/000225

§ 371 (c)(1),
(2), (4) Date: Dec. 20, 2006

(87) PCT Pub. No.: WO2006/006864

PCT Pub. Date: Jan. 19, 2006

(65) Prior Publication Data

US 2007/0200353 A1    Aug. 30, 2007

(30) Foreign Application Priority Data

Jun. 23, 2004    (NO) .................................. 20042626

(51) Int. Cl.
*F03B 13/10* (2006.01)
(52) U.S. Cl. ........................................... 290/53; 290/42
(58) Field of Classification Search .................. 290/42, 290/43, 53, 54
See application file for complete search history.

(56) References Cited

U.S. PATENT DOCUMENTS 1,078,323 A    11/1913   Trull (Continued)

FOREIGN PATENT DOCUMENTS

EP    0035346 A2    9/1981

(Continued)

OTHER PUBLICATIONS

International Search Report dated Sep. 26, 2005.

(Continued)

*Primary Examiner*—Nicholas Ponomarenko
(74) *Attorney, Agent, or Firm*—Andrus, Sceales, Starke & Sawall, LLP

(57) ABSTRACT

The special feature of this multiphase and multidimensional wave converter is that it exploits, in an efficient and enduring manner, substantially all of the energy in all waves of the sea, also side waves, and hence is capable of producing large amounts of cheap power. The wave converter comprises at least two buoyant elements (1) connected in a chain of rods (2A, 2B) and joints (3, 4). Each single buoyant element is in a different phase of the wave than that of the others. They will therefore absorb the energy from the relative motion and forces between each set of buoyant elements (1). Each of the elements (1) is capable of moving and pivoting in three dimensions whilst the energy from all these motions is exploited. The energy-producing devices may be comprised of fluid-driving pumps (7, 8, 9) responding to the pivoting of the joints (3,4) and the motion of the rods (2A, 2B). The wave converter absorbs energy from a varying wave spectrum and from all directions. The forces affecting the wave converter are balanced by the various buoyant elements (1), thus avoiding transmitting these forces via mooring. The wave converter provides appreciable economic advantages and durability. It may also operate at any place in the sea and the ocean, at shallow depths as well as at the large depths of the ocean.

9 Claims, 6 Drawing Sheets

U.S. PATENT DOCUMENTS

| | | | |
|---|---|---|---|
| 4,098,084 A | | 7/1978 | Cockerell |
| 4,118,932 A | | 10/1978 | Sivill |
| 4,560,884 A | * | 12/1985 | Whittecar .................... 290/42 |
| 4,684,815 A | | 8/1987 | Gargos |
| 4,781,023 A | * | 11/1988 | Gordon ........................ 60/506 |
| 4,883,411 A | * | 11/1989 | Windle ........................ 417/331 |
| 4,931,662 A | * | 6/1990 | Burton ........................ 290/42 |
| 6,109,029 A | * | 8/2000 | Vowles et al. ................. 60/398 |
| 6,291,904 B1 | * | 9/2001 | Carroll ........................ 290/53 |

FOREIGN PATENT DOCUMENTS

| | | |
|---|---|---|
| EP | 0035346 A3 | 2/1982 |
| WO | WO-00/08334 | 2/2000 |

OTHER PUBLICATIONS

Written Opinion dated Sep. 26, 2005.

* cited by examiner

MULTIPHASED AND MULTIDIMENTIONAL WAVE CONVERTER

CROSS REFERENCE TO RELATED APPLICATION

The present application is the U.S. national stage application of International Application PCT/NO2005/000225, filed Jun. 23, 2005, which international application was published on Jan. 19, 2006 as International Publication WO 2006/006864. The International Application claims priority of Norwegian Patent Application 20042626, filed Jun. 23, 2004.

BACKGROUND OF THE INVENTION

The present invention concerns a wave-powered generator, also termed a wave converter, which converts and exploits most of the energy in the waves in an efficient, simple, inexpensive, robust and durable manner. This completely new and different manner of extracting a lot of energy from the waves provides a solution making it possible to produce clean energy in an inexpensive and lasting manner. This makes the invention feasible, not just technically, but also with respect to commercial requirements. It has been tested in waves, and the description is in agreement with the laws of physics. There are many other patents in this field, but none of the technical solutions disclosed therein produce a lot of energy in a simple and inexpensive manner.

U.S. Pat. No. 4,098,084 by Cockerell describes a wave converter hinged together by means of flat buoyant members having pumps at the hinges thereof, and which produce energy when they oscillate (pivot). Due to the motion of the wave converter not corresponding to the motion of the water, this solution does not produce a lot of energy. Generally, the force vectors from the sea have a completely different direction than the directions for which the wave converter is designed to operate. The energy from the sea will allow the buoyant members to push and pull the hinges and tear them apart. The solution of Cockerell provides a short operating life and an excessively high electricity price.

PCT/NO99/00243, which corresponds to publication WO 00/08334, describes a two-phased wind-wave motor, the motor of which exploits the energy from the relative motions between two different phases of the wave, and which further exploits both the vertical and the horizontal particle motions in the waves. Moreover, there is a fixed construction that interconnects the buoys of the same phase in each of the two groups of buoys. This solution has proven to produce a relatively large amount of energy. Although favourable, this solution suffers from the limitation of employing only two different phases of the waves instead of employing more phases thereof. Furthermore, the motor is provided with an interconnecting construction between the buoys of the associated phases, thereby occasionally transmitting some energy that may cause unnecessary wear and tear thereof.

SUMMARY OF THE INVENTION

In the new invention disclosed herein, any desired number of different phases may be employed, thereby exploiting the energy derived from the relative motions between each single buoyant element 1 and the two closest buoyant elements. This produces more energy and also provides a simpler design. In this invention, it is possible to omit said construction of the aforementioned patent application, the construction of which fixedly connects the buoys belonging to the same group and phase. Each buoyant element may operate in the phase that is suitable with respect to the wave within which it is located. Due to the absence of torsional forces to wear down the claimed structure, the strength of the structure is improved. These advantages allow for a lower price per electricity unit and also a stronger and more elegant design.

Hereinafter, a short description of these three points is provided:

1. Higher efficiency. Each single buoyant element absorbs the energy derived from the relative motions of its own phase and the phase of the two closest buoyant elements. As such, the buoyant element is able to absorb the energy available in "its own" wave at any time (i.e. the wave within which the element floats) relative to the two closest buoyant elements. This becomes more noticeable when the waves vary in size, both within a short time and a long time. The wave converter will also provide a higher efficiency because the distance between the buoyant elements may be varied and adapted according to the wavelength.

2. Better economics. Insofar as there is no fixed interconnecting construction between the buoyant elements, the building costs are less. Moreover, the high-energy production provides for better economics. As is common, the term economics, as defined herein, is taken to mean the ability to produce energy at a lowest possible sales price per electricity unit.

3. Stronger structure. The strength and durability of a structure depends on a number of factors. One of them involves the magnitude of the forces acting on the structure. If these forces are minor, the structure is more durable and will last longer than if the forces were major.

Contrary to common belief, these forces and the energy are not equal to the energy available in the sea. A match, for example, will not break whilst floating at sea during a fierce hurricane. This is because the forces of the sea bypass the match. Due to no counter force, the match accompanies the forces. Even upon administering a hammer blow, this match will remain totally intact whilst floating in the water. This is to show that it is not always the strongest object that proves to be most enduring, as explained by Newton's $3^{rd}$ law concerning an action equal to an opposite reaction. Strength involves the manner in which energy is controlled. The manner in which this wave converter controls energy discloses a couple of physical similarities to that of the match of the hypothetic example, the similarities being:

There are no mooring forces between the floating structure and its associated mooring;

None of the forces entering through the structure are larger than those required for the wave converter to produce as estimated. These forces are restricted by the amounts of energy that the wave converter produces, and also to the locations of the structure at which the forces act. Due to the structure having a high efficiency, i.e. implying that the wave converter absorbs, converts and produces a lot of energy, the structure provides a favourable strength and durability. Each single buoyant element allows the enormous forces of the sea to move the buoyant element freely in all directions whilst absorbing and exploiting all of this energy without any forces wearing down the structure. Mechanical and energy-producing units absorb the energy.

DESCRIPTION OF DESIGN AND MODE OF OPERATION

The water moves each single buoyant element around in its own special phase of the wave, and energy is produced from the forces in the relative motions between each buoyant element and the two next elements (or one at either side) in a chain thereof. The buoyant elements move both vertically and horizontally, and they move in a circular, elliptical or other curvilinear motion whilst rotating about the axes thereof. The phase difference between the motions of each one of these buoyant elements, and also those of other elements, produces this (relative) energy. Yet further, each successive buoyant element assembled within a chain, harvests the energy of a new phase of the wave.

Insofar as several successive buoyant elements experience different phases of the wave, the wave converter will exploit the relative difference in motion between the buoys in order to harvest the energy of the waves. The wave converter may exploit energy from several wave spectra from several directions simultaneously. In this manner, the wave converter harvests substantially all of the energy of the sea wave.

Figure 3:
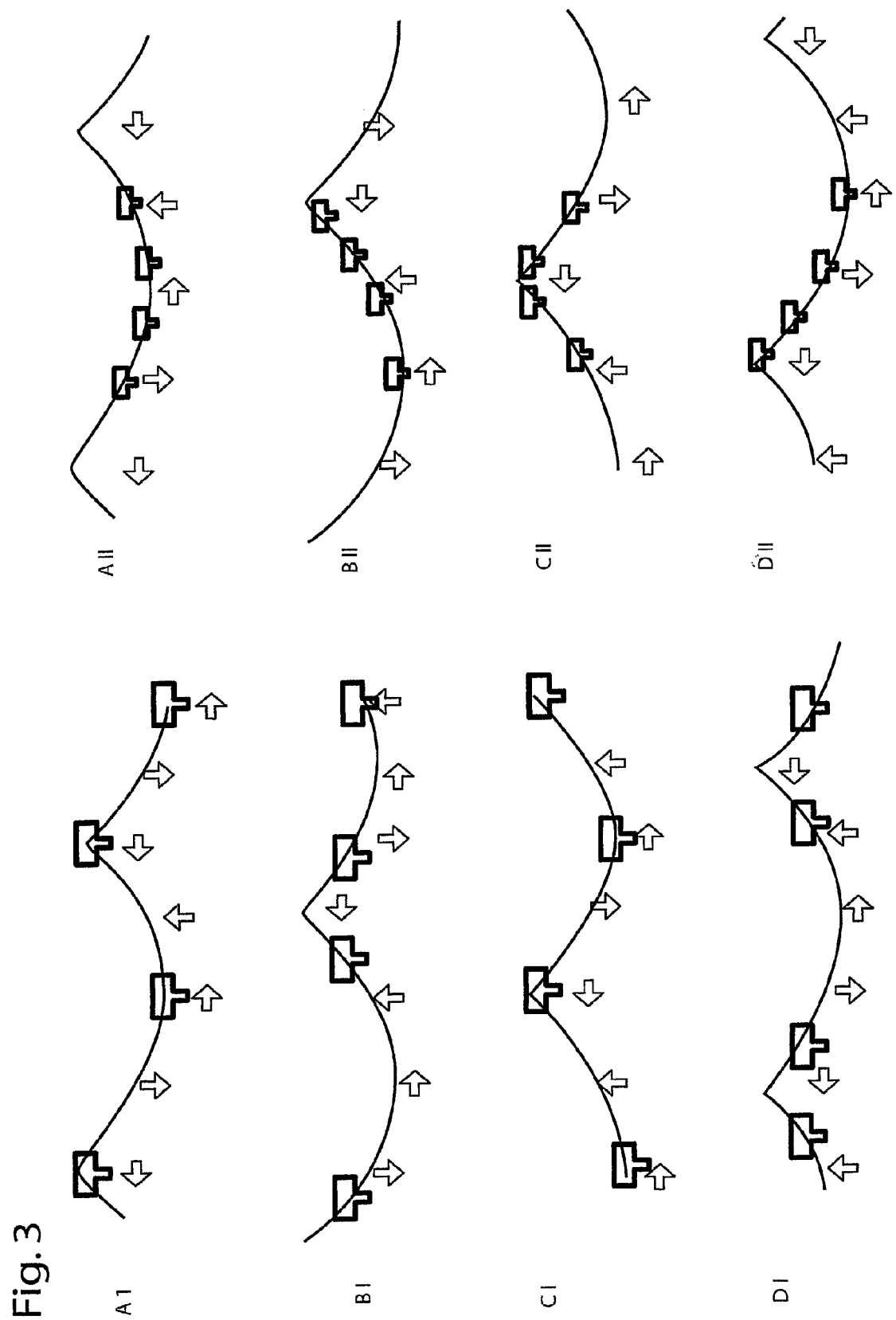
FIG. 3, as represented by eight schematic drawings, shows the motion patterns of the wave converter in water at four different moments in time, drawings AI-DI illustrating the wave converter operating in small waves, and drawings AII-DII illustrating the wave converter operating in large waves.

FIG. 3, which comprises eight drawings, shows the motions of the wave converter. The schematic drawings AI, BI, CI and DI illustrate four moments in time, each letter depicting the wave a quarter of a wave period later than the preceding drawing. Drawings AII, BII, CII and DII illustrate the same as in the preceding example, however the difference being that the wave is much larger. From this it may be observed that both the vertical and the horizontal relative motions are appreciable in view of all the different sizes of waves. These drawings also illustrate that the wave converter may be a small-scale structure relative to the size of the wave, yet it may operate in an efficient manner. The ratio of energy production to building cost therefore will be favourable.

A chain of rods 2A, 2B (or tubes) and movable joints 3, 4 are interconnected so as to allow each end of each rod to be connected to a movable joint, which is further connected to the next rod, thus forming a continuous chain thereof. One buoyant element 1, or a set thereof, is/are connected to every other joint 4, starting at the first joint, each element 1 having its centre of gravity at the middle of the joint 4. Moreover, the buoyant elements 1 may pivot spherically about this point in the joints. This pivoting is arranged so as to provide a controlled resistance from a hydraulic (or pneumatic) pump 7, 8, 9, the function of which is to absorb impacts and, simultaneously, also to produce energy. At least three buoyant elements 1 are used, each being spread out and having a vertical plate provided midways underneath it. These vertical plates, which are directed downwards in the water, harvest the energy from the horizontal wave motions, which they follow to a certain degree. The water moves forward at the crest of the waves and move backwards at the bottom of the waves. Simultaneously, each element 1 is lifted up due to its buoyancy and is pulled down by its weight, thus alternating the altitude thereof. The element 1 may freely follow a circular, elliptical or curvilinear path of motion.

In order to prevent the buoyant elements 1 from pivoting and tipping over when the water pushes against the vertical plates underneath them, and also to keep these plates vertical, the joints are interconnected using double sets of rods. This rod arrangement is shown in FIG. 1A. The four attachment points 21 thereof, one at each end of each of the two rods 2, are placed so as to have equal distance therebetween when arranged in pairs, said four attachment points 21 thus being arranged so as to form the four corners of a parallelogram, the angles of which, as pairs, may be varied.

Alternatively, in order to provide simplified larger structures, the aforementioned mechanical arrangement may be substituted with a corresponding hydraulic arrangement. As such, one of said rods is then replaced by a hydraulic hose (or tube), which connects a rotary pump, which is located on a toggle joint 3 between the buoyant elements 1, with a rotary pump located on each of the closest buoyant elements 1. These hydraulic hoses (or tubes) are connected in a manner allowing the cylinder volume to follow the outer angle of the pump chamber of the middle joint 4 (FIG. 6) in a proportional manner. To accompany this constellation, the pump chambers follow the two joints attached at each buoyant element 1 in a supplementary manner. The sum of the volumes of these three chambers will be constant all the time. Accordingly, the sum of the corresponding angles will also be constant, thus maintaining the faces of the buoyant elements 1 in a vertical position Any relative motion of one buoyant element relative to the two closest buoyant elements will change the angle between the rods. The vertical relative motion changes the angle having the joint 4 at its apex, and the buoyant elements 1 at its feet. The horizontal motion changes the angle between the next two toggle joints 3. As described hereinbefore, each single buoyant element 1 will roll along with the wave in a circular (or some other curvilinear) manner and alternately change said two angles of the two joints 3 and 4. Insofar as the pumps associated with joint 4 work at best whilst the pumps associated with the toggle joint 3 pump the least, and vice versa, the energy production therefore becomes continuous and efficient. Accordingly, the wave converter delivers energy continuously over time.

Units, which are responsive to the angular change, produce the energy. This may be carried out in many different ways, as desired, and may involve the use of linear pumps or rotary pumps operated via magnetic, mechanical, pneumatic or hydraulic units. Valves, which alternately retard and delay the timing of the vertical and horizontal motions, provide the phase control for increasing the energy adsorption. This is elegantly suitable for this structure, in which alternation between the vertical and horizontal energy flows is regular and has a constant sum within all time periods, hence being continuous in time. For this reason, it is sufficient to keep the valves closed when the pressure is below a certain level, and open when the level is exceeded. If desirable, hydraulic and pneumatic pumps may be embodied within linear pumps. However, the structure becomes more elegant, simpler and stronger by incorporating such pumps into the joint, thereby allowing the pivoting to take place in the joint so as to compress the fluid directly.

Figure 4:
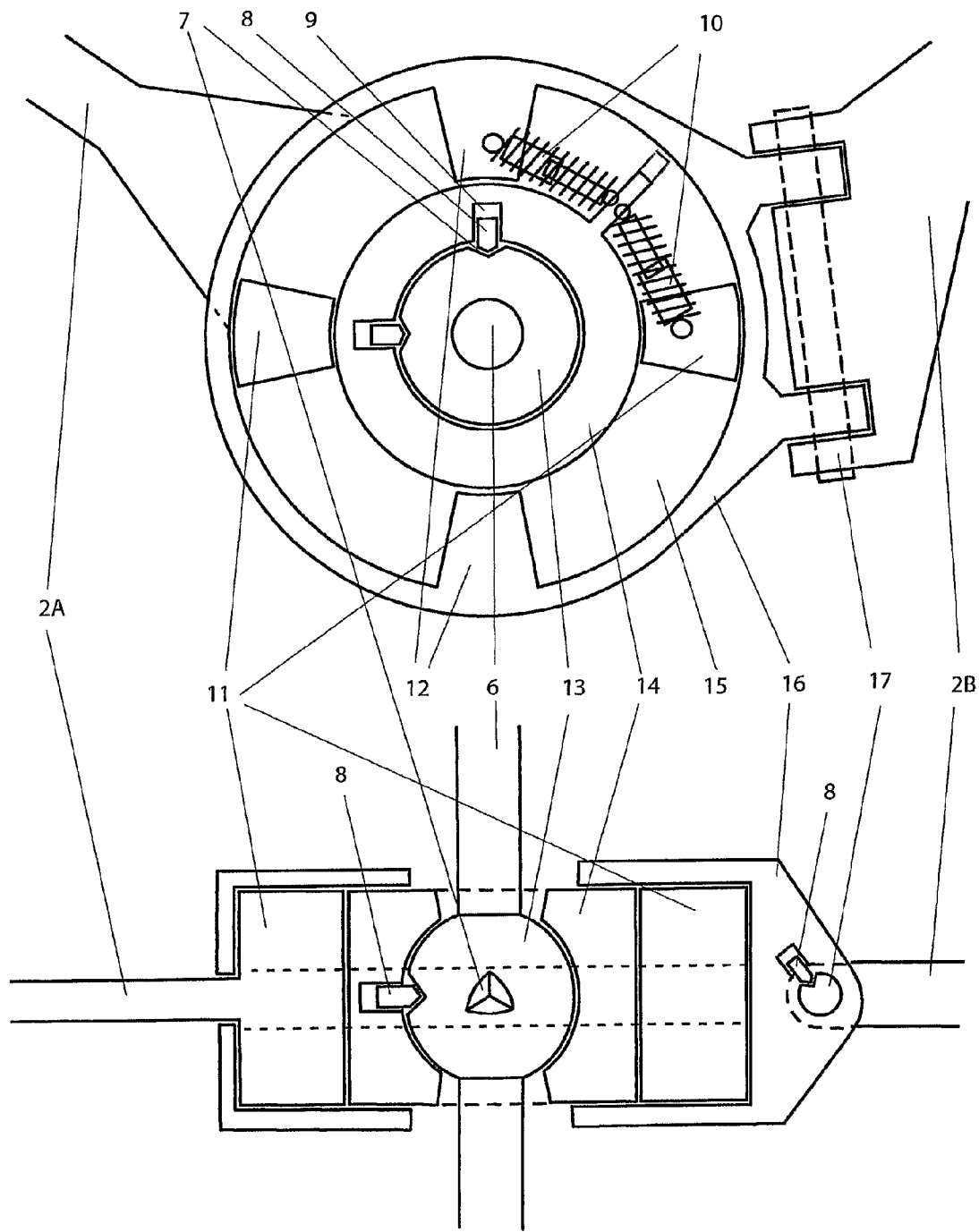
FIG. 4 shows a further detailed front elevation and plan view of an energy-producing joint incorporated in a buoyant element of the wave converter, the movable joint incorporating a hydraulic pump arrangement capable of producing hydraulic energy in response to two-dimensional, wave-induced pivoting of the joint.
Figure 5:
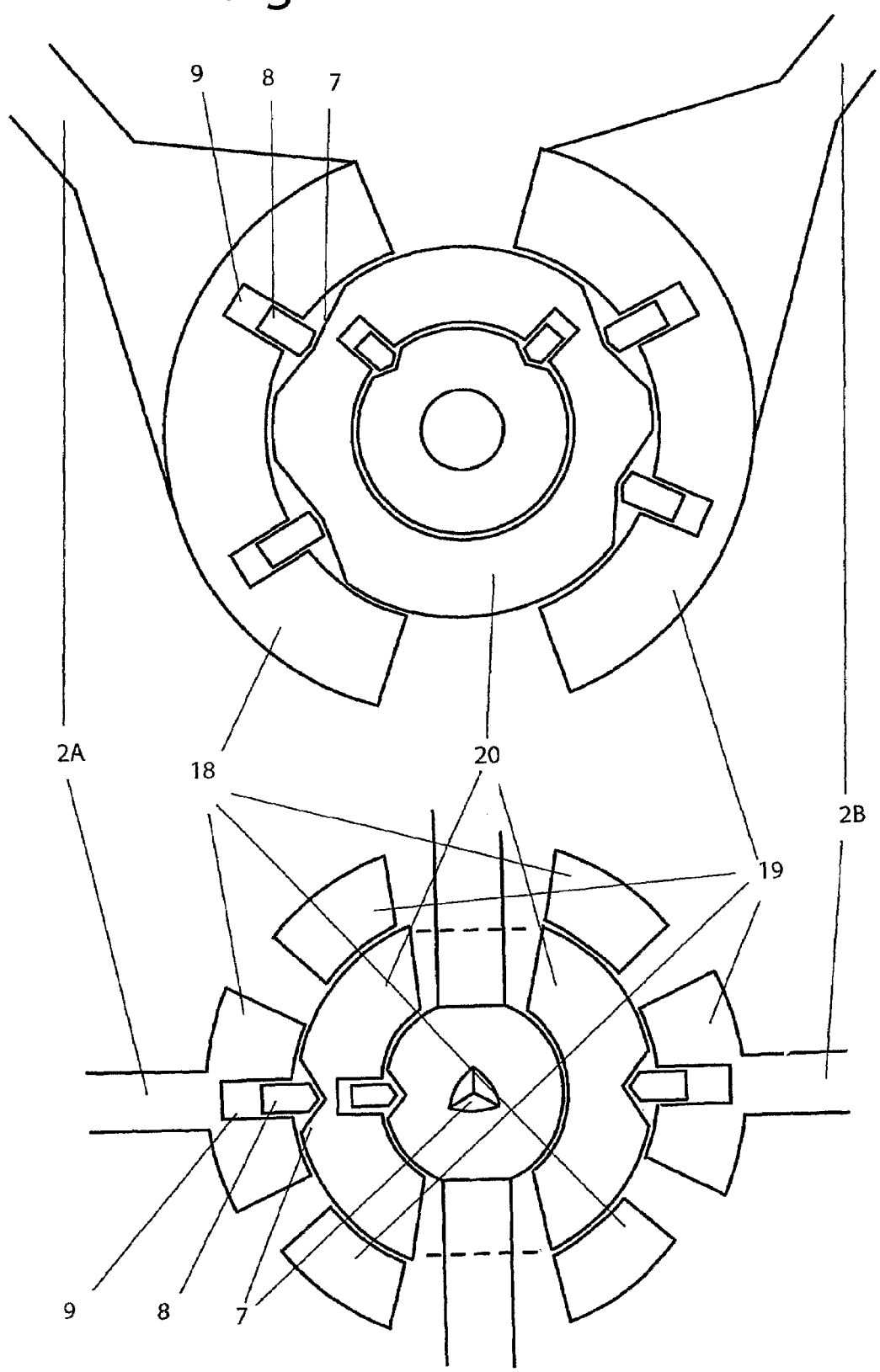
FIG. 5 shows a further detailed front elevation and plan view of an alternative energy-producing joint incorporated in a buoyant element of the wave converter, the alternative movable joint incorporating a hydraulic pump arrangement capable of producing hydraulic energy in response to three-dimensional, wave-induced pivoting of the joint.
Figure 6:
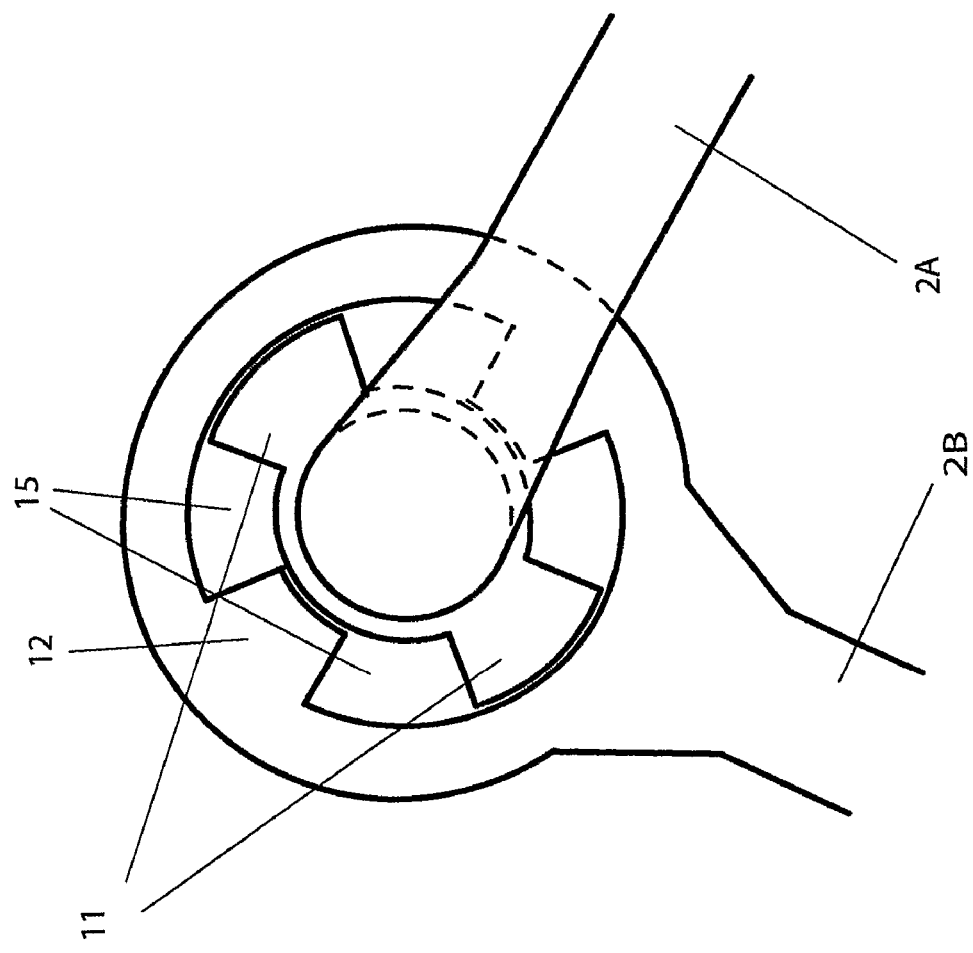
FIG. 6 is a further front elevation of an energy-producing joint resembling that of FIG. 4 and showing two adjoining rods articulately linked via the energy-producing joint.

These movable joints 4, which are shown in detail in FIGS. 4, 5 and 6, produce energy by pumping fluid in response to motion and pivoting in any direction of the buoyant elements 1. Part 6 connects buoyant element 1 with the joint 4, which is located closest to the buoyant element 1. Part 6 is fixedly connected to a ball 13 located in the middle of this joint. Two recesses 7 are milled into this ball surface, the recesses 7 having approximately a 90-degree angle therebetween, and the vertex of the angel is in the ball centre. When this ball 13 pivots within an enclosing part 14, cf. FIG. 4, the ball pushes one or both of the pistons 8 and force them to pump fluid that is located within the cylinders 9. Simultaneously, the pressure of this fluid keeps said ball 13 at a constant angle so as to maintain and stabilize the buoyant element 1. This ball 13 is enclosed by a part 14, which is spherical at the inside thereof and cylindrical at the outside thereof. Furthermore, conical openings have been provided at the axial ends of the intermediate part 14, thereby providing space for the rod 6 to pivot to a certain degree along with the innermost ball 13, cf. plan view drawing at the bottom of FIG. 4.

Alternatively, the central part 13, which is fixedly connected to a buoyant element 1, may be replaced by a pyramid-shaped part, which is clamped in place by two enclosing parts. Consequently, a single one of these two enclosing parts may absorb all of the energy resulting from the pivoting about two axes on this central part 13.

FIG. 4 also shows two spring-loaded pumps 10 attached to said intermediate part 14. Each pump 10 is attached to each of the two pairs of pistons 11, 12 gliding on the outside of the intermediate part 14. Substantially, this springing action renders both of the angles equal between the buoyant element 1 and the two associated rods 2A, 2B, thereby allowing the angle of the buoyant element 1 to follow the water surface. From a central control unit, these spring-loaded pumps 10 may also control the angle of the buoyant element 1 so as to keep it in a precise and optimum position of choice. Two pairs of pistons 11, 12 glide along the outer cylindrical surface of intermediate part 14, each pair being fixedly attached to its own rod 2A or 2B, which projects outwardly from each side of the joint 4. When the angle between these two rods 2A, 2B changes, the distance between the two pairs of pistons 11, 12 will also change, thereby allowing them to pump fluid for energy production. The two pistons 12 are connected to an outer housing 16, which is attached to rod 2B by means of a hinge and its axle 17. Such a hinge allows the joints 4 of the buoyant elements 1 to move sideways about said axle 17, and without being interlocked when subjected to sideways forces from the water. Moreover, the energy of the sideways forces is adsorbed and exploited by means of an energy-producing pump connected to said hinge, cf. the plan view drawing at the bottom of FIG. 4.

The two pistons 11 are attached to a disc connected to the rod 2A. The surface of this disc is perpendicular to the cylinder axis of part 14, and the disc glides closely on the outside of part 14, yet on the inside of said housing 16. The rod 2A pivots along with this disc and the two pistons 11. To render this motion possible, a slot is provided in the housing 16 for accommodating this pivoting action.

Alternatively, as shown in FIG. 5, the preceding energy-producing design of joint 4 may be replaced by another design, all parts of which are capable of three-dimensional pivoting by employing spherical gliding surfaces between said parts. The advantage of this alternative is that the whole structure becomes simpler and contains fewer parts. The innermost ball 13 is identical in both alternatives. In FIG. 5, however, an intermediate part 20, which encloses the ball 13, is also provided with a spherical outside. Two identical parts 18 and 19 are arranged so as to glide on the outside of intermediate part 20, and the parts 18, 19 are arranged symmetrically about the centre of said ball. In order for the parts 18, 19 to pivot somewhat spherically, a clearance is provided between them. Part 18 is attached to rod 2A, and part 19 is attached to rod 2B. When these two rods 2A, 2B pivot with respect to one another, thereby changing the angle between them, four outer pumps will produce energy, in which two pumps are placed on each of the two parts 18, 19. The pumps will produce energy in response to any three-dimensional pivoting owing to the relative motions between the parts of the claimed energy-producing wave converter. This also includes pivoting actions taking place about the axes going through the centre of said ball.

REFERENCE NUMERALS ON THE DRAWINGS

Figure 1:
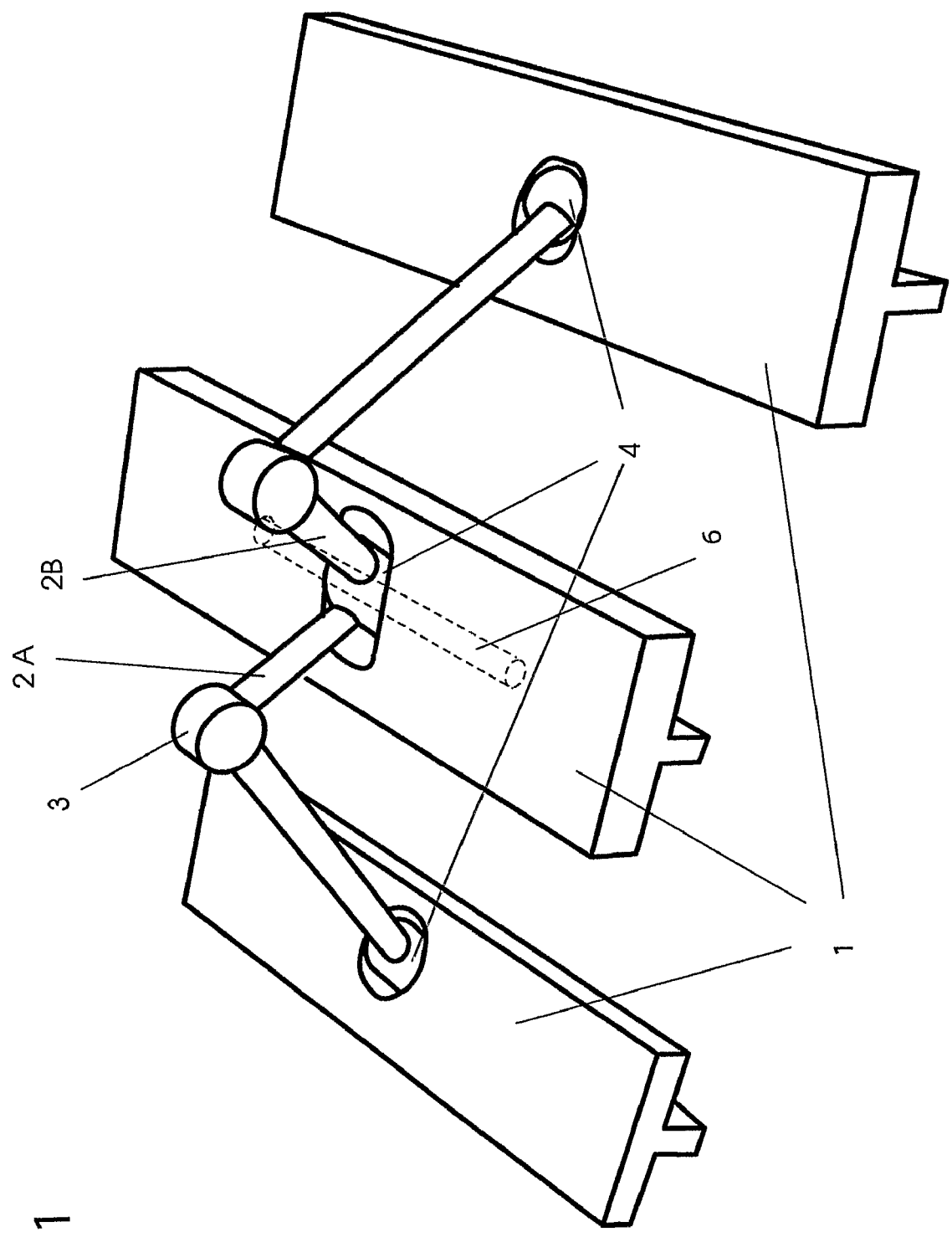
FIG. 1 is a perspective view of a section of a wave converter in accordance with the present invention, the section of the wave converter comprising buoyant elements articulately linked via rods and intervening, movable joints capable of producing energy in response to wave motions impinging on the wave converter.
Figure 2:
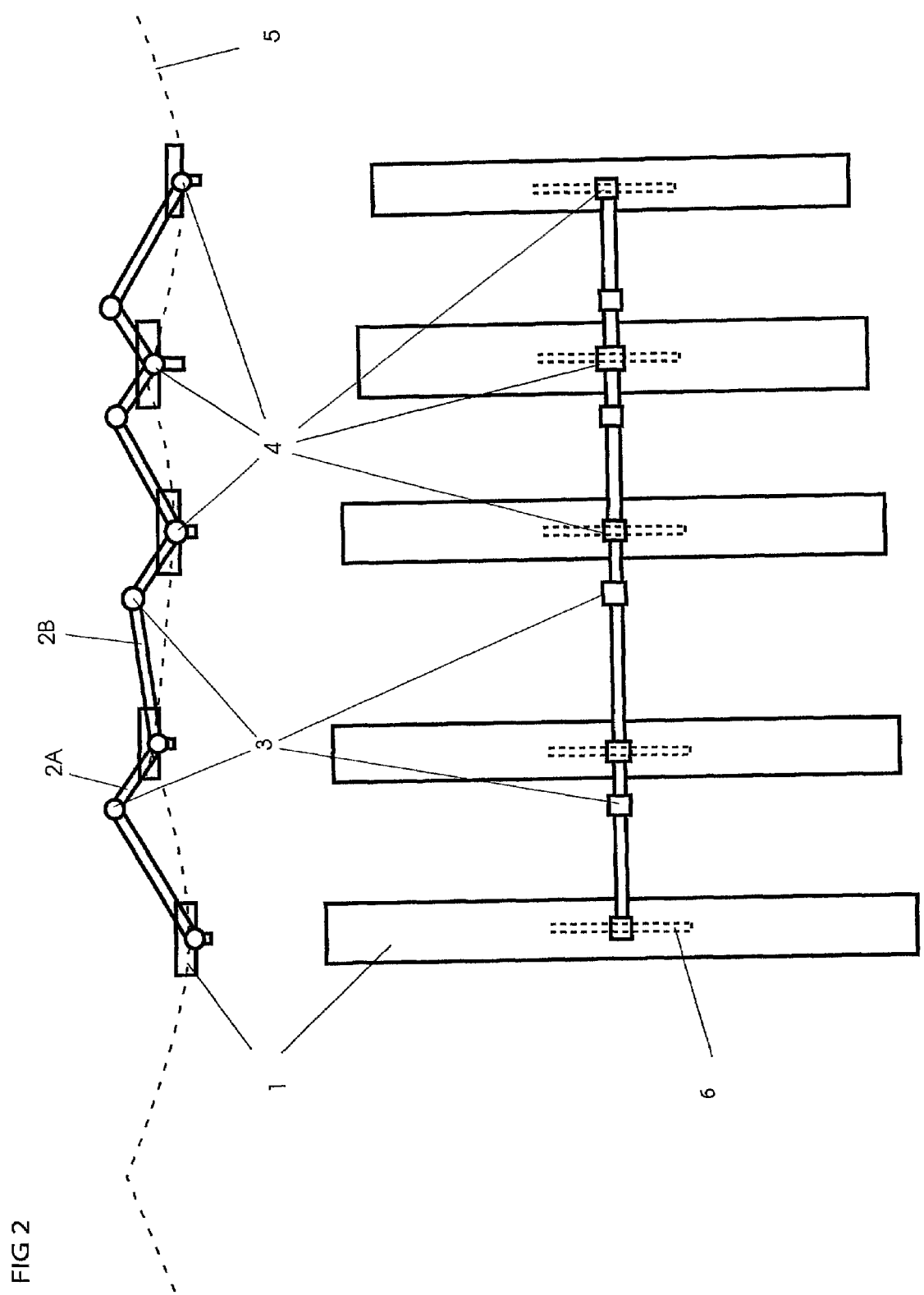
FIG. 2 shows a front elevation and a plan view of the wave converter in accordance with the present invention, the wave converter comprising a chain of buoyant elements linked sequentially via said rods and intervening, energy-producing joints.

FIGS. 1 and 2:
1 Buoyant elements;
2 Rods or tubes;
3 Toggle joints provided with energy-producing devices; cf. details of FIG. 6;
4 Joints provided with energy-producing devices; cf. details of FIGS. 4 and 5;
5 Water surface showing the shape of the waves;
6 Axle connecting the buoyant element 1 with joint 4.
FIG. 3: Shows the motions of the buoyant elements in the waves.
FIG. 4:
7 Milled-down recess;
8 Piston;
9 Cylinder filled with fluid;
10 Pump provided with a spring;
11 Pivoting pistons;
12 Pivoting pistons; moving in opposite direction to that of pistons 11;
13 Ball; fixedly connected to axle 6 and buoyant element 1;
14 Part with inwardly concave spherical shape;
15 Cylinder filled with fluid;
16 Enclosing part or housing; fixedly connected to pistons 12;
17 Axle within hinge connecting rod 2B to housing 12.
FIG. 5: Alternative energy-producing joints replacing those of FIG. 4.
18 Part with internal spherical shape;
19 Part symmetrically identical to part 18 and placed symmetrically in respect thereof;
20 Part pivoting within part 18 and part 19.

The invention claimed is:
1. A wave converter for exploiting energy from waves in water, said wave converter comprising two or more buoyant elements to be aligned parallel alongside wave crests in the water, wherein the buoyant elements are connected sequentially via rods connected to two buoyant elements floating alongside one another in the water, said rods extending perpendicular to the longitudinal direction of the buoyant elements;

wherein each buoyant element is provided with an energy-producing, multi-axial, pivotable joint to which the rods are attached; and wherein two rods, which are connected to two buoyant elements, are interconnected by means of an energy-producing, pivotable toggle joint.

2. The wave converter according to claim 1, wherein the wave converter comprises two sets of double, parallel rods that connect the joints of each buoyant element; and wherein the four attachment points of the rods are arranged so as to form four corners of a parallelogram, thereby allowing each buoyant element to move without tipping over.

3. The wave converter according to claim 1, wherein each energy-producing unit of the wave converter is comprised of three pumps, which are connected so as to allow the sum of their pump volume to be constant;

wherein one of the three pumps is located on the toggle joint, which connects the two rods; and wherein the other two pumps are located on the multi-axial, pivotable joint of each of the rods;

whereby the buoyant elements will always remain in the same mutual angle, thereby allowing them to move without tipping over.

4. The wave converter according to claim 1, wherein said joint comprises a ball and an enclosing part, said ball being connected to a buoyant element, and said enclosing part being connected to said rods;

wherein the surface of the ball is provided with at least one recess; and wherein said enclosing part is provided with at least one cylinder having a piston extending into a recess;

whereby wave-related pivoting of the ball relative to the enclosing part moves the piston in and out of the recess so as to reciprocate the piston within the cylinder, thereby providing an energy-producing pumping action therein.

5. The wave converter according to claim 1, wherein said wave converter comprises:

a long buoyant element connected to energy-producing, multi-axial, pivotable joints;

two or more parallel rods of equal length placed perpendicular to the longitudinal direction of the buoyant element; and wherein four attachment points, one at each end of the rods, are arranged so as to form the four corners of a parallelogram, thereby allowing said buoyant element to move parallel relative to the connecting joint.

6. The wave converter according to claim 1, wherein said wave converter comprises energy-producing, multi-axial, pivotable joints attached at each end of said rod or rods so as to interconnect two and two hydraulic pumps at each end of each rod; and wherein said two pumps are interconnected, in a supplementary manner, with two mutually parallel axes, one at each end of the rod, thereby allowing the sum of the pump volume of the two cylinders to be constant, hence allowing parallel movement of the buoyant elements in all planes relative to the connection element at the other side of the joints.

7. The wave converter according to claim 2, wherein each energy-producing unit of the wave converter is comprised of three pumps, which are connected so as to allow the sum of their pump volume to be constant;

wherein one of the three pumps is located on the toggle joint, which connects the two rods; and wherein the other two pumps are located on the multi-axial, pivotable joint of each of the rods;

whereby the buoyant elements will always remain in the same mutual angle, thereby allowing them to move without tipping over.

8. The wave converter according to claim 2, wherein said joint comprises a ball and an enclosing part, said ball being connected to a buoyant element, and said enclosing part being connected to said rods;

wherein the surface of the ball is provided with at least one recess; and wherein said enclosing part is provided with at least one cylinder having a piston extending into a recess;

whereby wave-related pivoting of the ball relative to the enclosing part moves the piston in and out of the recess so as to reciprocate the piston within the cylinder, thereby providing an energy-producing pumping action therein.

9. The wave converter according to claim 3, wherein said joint comprises a ball and an enclosing part, said ball being connected to a buoyant element, and said enclosing part being connected to said rods;

wherein the surface of the ball is provided with at least one recess; and wherein said enclosing part is provided with at least one cylinder having a piston extending into a recess;

whereby wave-related pivoting of the ball relative to the enclosing part moves the piston in and out of the recess so as to reciprocate the piston within the cylinder, thereby providing an energy-producing pumping action therein.

\* \* \* \* \*